United States Patent [19]
Dragan

[11] 3,900,954
[45] Aug. 26, 1975

[54] DENTAL FILLING GUN AND NOZZLE TIP THEREFOR

[76] Inventor: William B. Dragan, R.F.D. No. 1, Burr St., Fairfield, Conn. 06430

[22] Filed: July 10, 1974

[21] Appl. No.: 487,230

[52] U.S. Cl. .................................................. 32/60
[51] Int. Cl.² .......................................... A61C 5/04
[58] Field of Search ........ 32/60; 220/31.5; 128/261, 128/263; 222/386, 326

[56] References Cited
UNITED STATES PATENTS

| | | |
|---|---|---|
| 3,063,549 | 11/1962 | Weichselbaum .................... 220/315 |
| 3,521,356 | 7/1970 | Newman ................................. 32/60 |
| 3,581,399 | 6/1971 | Dragan ................................... 32/60 |

*Primary Examiner*—Robert Peshock
*Attorney, Agent, or Firm*—Arthur T. Fattibene

[57] ABSTRACT

A dental filling gun and nozzle tip which includes a barrel housing, a plunger reciprocally mounted within the housing, each being preferably formed of plastic material, and having a detachable plastic nozzle tip which defines a reservoir for containing a predetermined amount of dental filling material. The nozzle tip includes a displaceable piston which is integrally connected to the body portion of the nozzle tip and which piston functions to extrude the dental filling material through the discharge end of the nozzle.

10 Claims, 7 Drawing Figures

DENTAL FILLING GUN AND NOZZLE TIP THEREFOR

PROBLEM & PRIOR ART

Heretofore it was generally customary for dentist to apply a dental filling compound to a prepared cavity by a spatula or similar hand tool. This technique filled the tooth cavity from the outside-in, and which technique often times would result in the formation of undesirable voids within the cavity. More recently a tooth filling technique has been developed wherein the dental filling material has been applied to a tooth cavity by extruding the material through the nozzle of an applicator gun, e.g., of the type disclosed in my U.S. Pat. No. 3,581,399. The applicating gun technique has the advantage that cavities could be filled from the inside out and thereby eliminate the voids incidental to the spatula filling technique. However with the gun applicating technique it was necessary for the dentist to fill the nozzle tip with a predetermined amount of filling compound and then cap the tip with a piston. Because such tip and piston are relatively small, some difficulty was encounterd in locating and properly positioning the piston within the nozzle tip.

OBJECTS

An object of this invention is to provide an improved dental filling gun and nozzle tip therefor which can be readily fabricated of relatively inexpensive materials.

Another object is to provide a dental filling gun with an improved nozzle tip construction where in the nozzle tip and piston are integrally formed.

Another object is to provide an improved nozzle tip for use with a dental filling gun in which the extruding piston is integrally connected to the nozzle tip, yet is rendered freely displaceable within the tip to effect the extrusion of the filling material upon displacement thereof.

Another object is to provide an improved dental filling gun which can be readily manufactured and assembled, and which is made up of component parts that can be readily formed whereby respective parts can be readily assembled and disassembled without the need of any tools.

BRIEF SUMMARY OF INVENTION

The foregoing objects and other features and advantages are attained by a dental filling gun or applicator which can be formed of relatively inexpensive material and comprises a housing having a plunger reciprocally mounted for movement therein between a retracted inoperative position and a projecting operative position. The housing and plunger are formed with complementary friction bearing surfaces to provide a friction stop so as to prohibit the plunger from being pulled free of the housing unless a predetermined force is applied to the plunger. The plunger is formed with an end cap which can be readily press fitted to the plunger stem. The dental filling gun is also provided with an improved nozzle tip which includes a tubular body portion for containing a supply of dental filling material and a connected discharge tip portion through which the dental filling material is extruded. The nozzle is also provided with a piston which is readily displaceable within the tubular body portion and which piston is integrally fastened or connected thereto by a flexible connector or cord-like structure. The arrangement is such that the piston is at all times secured to the nozzle body portion where it can be readily inserted therein to seal the dental filling material in preparation for extruding the material therefrom and whereby the piston can be readily displaced within the body portion of the nozzle while integrally secured thereto. The arrangement is such that the nozzle and associated piston can be readily molded or fabricated as a unitary member.

FEATURES

A feature of this invention resides in the improvement of a dental applicator gun and nozzle therefor which can be readily fabricated of a relatively few component parts of relatively inexpensive material.

Another feature resides in a dental gun applicator in which the barrel housing and reciprocating plunger have complementary surfaces to provide a friction stop to prohibit unintentional separation of the plunger from the barrel housing in the retracted position of the plunger.

Another feature resides in the unitary construction of the nozzle and piston which enables the piston to be integrally connected to the nozzle while at the same time can be readily displaceable relative thereto to effect the control extrusion of the dental filling material therefrom.

Another feature resides in the construction of a nozzle tip and associated piston which can be readily fabricated as a unitary member of relatively inexpensive material, and which tip is readily expendable after use.

Another feature resides in the provision of a unitary construction of a nozzle tip and readily displaceable piston arranged in a manner whereby the piston can be easily positioned in place within the nozzle tip with a maximum of ease and minimum loss of time.

Other features and advantages will become more apparent when considered in view of the drawings and specification.

DETAILED DESCRIPTION

Figure 1:
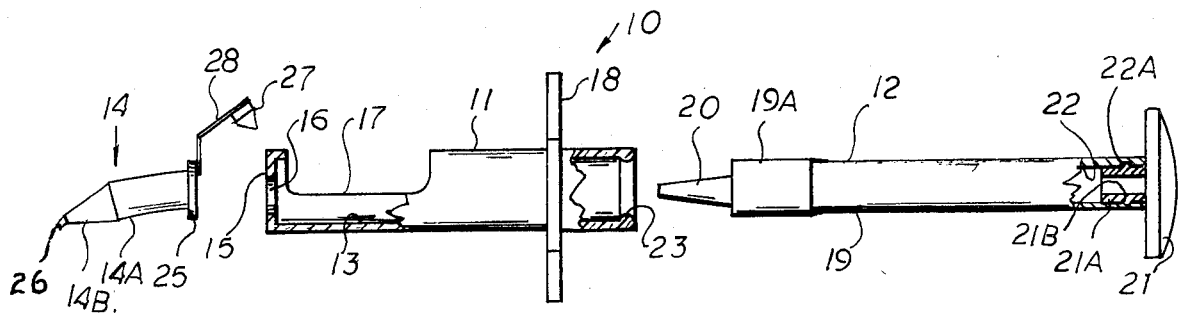
FIG. 1 is an exploded side elevation view of the improved dental gum and nozzle tip therefor, having parts shown in section.
Figure 3:
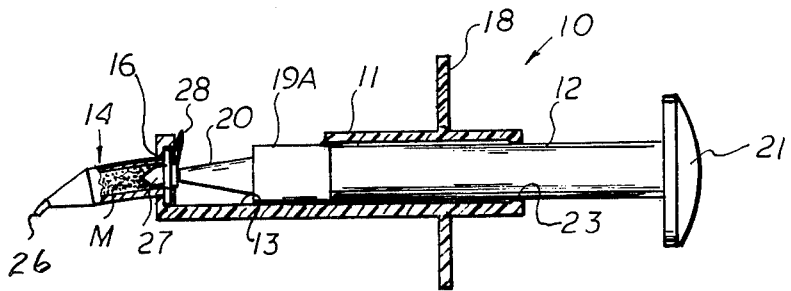
FIG. 3 is a side elevation view shown partly in section illustrating the component parts in position to initiate the extruding of the dental material therefrom.
Figure 2:
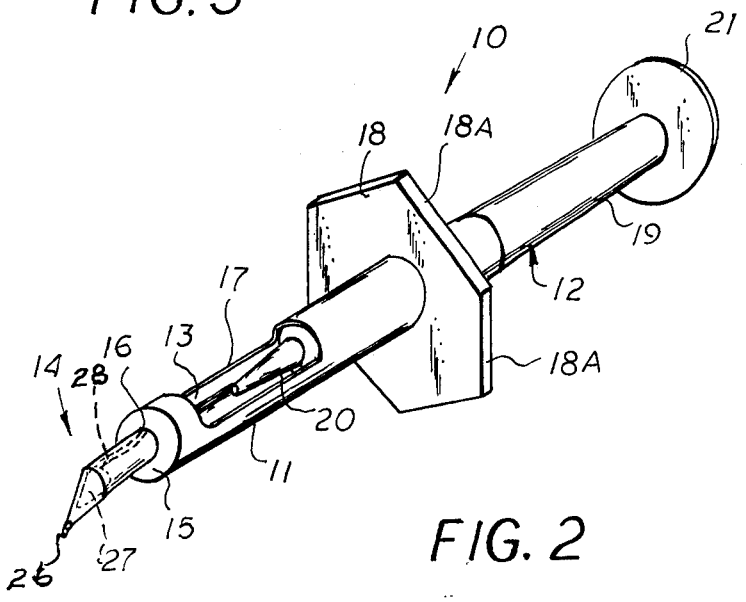
FIG. 2 is a perspective view of the dental applicating gun and nozzle tip illustrating the plunger in the retracted position thereof after the dental filling material has been extruded from the nozzle tip.

Referring to the drawings, there is shown in FIGS. 1, 2 and 3 a dental applicating gun 10 which is particularly adapted for extruding the dental filling material as for example, composite resins, such as Adaptis, Addent, and the like into a prepared cavity. As best seen in FIGS. 1, 2, and 3, the dental applicating gun 10 comprises a tubular housing 11, a plunger means 12, which is adapted to be slideably mounted within the bore 13 of the housing for movement between a retracted, inoperative position and a projected operative position. A nozzle means 14 adapted to contain a predetermined amount of the filling material to be extruded into a prepared cavity is constructed and arranged so as to be detachably connected to the end of the barrel housing 11.

The barrel housing 11 of the applicating gun comprises an elongated tubular member which is formed with an internal bore 13 extending therethrough. Adjacent the front end of the barrel housing 11 there is provided an end wall 15. As shown, the end wall 15 has an opening 16 formed therein for receiving the nozzle means 14 as will be hereinafter more fully described. The other end of the housing is opened for receiving the plunger means 12. A circumferential portion of the barrel housing, adjacent the end wall 15, is formed with a breech opening 17. The breech opening 17 is sized so as to facilitate the insertion therein of a nozzle means 14 as will be hereinafter more fully described.

Intermediate the ends of the housing 11 there is provided a laterally extending finger grip or flange 18. As best seen in FIG. 2, the finger grip or flange 18 is provided with a plurality of straight edges 18A, which will enable a dentist to place the dental applicating gun 10 on a suitable supporting surface without rolling.

Figure 4:
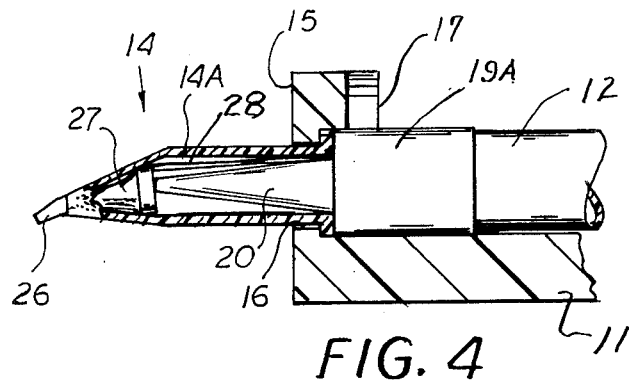
FIG. 4 is a fragmentary showing of the dental applicating gun and nozzle tip thereof illustrating the relative position of the component parts after the dental material has been extruded from the nozzle tip.

The plunger means 12 is arranged so as to be reciprocably moveable within the bore 13 of the housing 11 for movement between a normal retracted position as seen in FIG. 2 and a projected position as is fragmentarily shown in FIG. 4. As best seen in FIGS. 1 and 2, the plunger means 12 comprises a plunger stem 19 which is provided at its leading end with a reduced projecting tip 20. The projecting tip 20 is sized so that it can be readily projected through the opening 16 formed in the end wall 15. Connected to the other end of the plunger stem 18 is an end cap 21. In the illustrated form of the invention, the plunger stem 18 adjacent the end cap 21 is provided with a bore 22 having formed about the internal surface thereof, a circumscribing locking groove 22A. The end cap 21 is provided with a projecting boss portion 21A which is sized so as to be received within the stem bore 22. Circumscribing the boss portion 21A of the end cap 21 is a circumscribing bead or projection 21B which co-acts with groove 22A in the assembled position of the cap 21 with the plunger stem 19, and functions to frictionally engage and lock the end cap 21 securely to the plunger stem 19.

Figure 7:
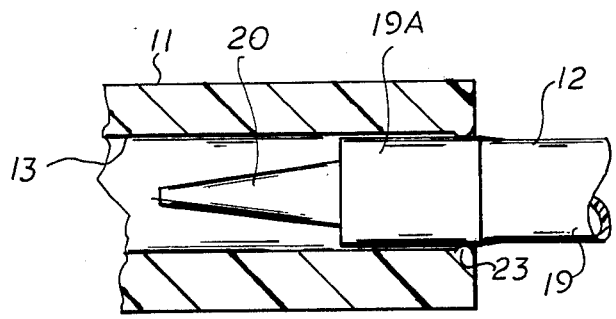
FIG. 7 is an enlarged fragmentary sectional view illustrating a detail of construction.

In accordance with this invention, the portion 19A of the stem 19 adjacent the projecting tip 20 is provided with a slightly enlarged circumference to provide a frictional resistance between the tubular housing 11 and the plunger means 12 when the plunger is retracted beyond the trailing end of the breech opening 17, as best seen in FIG. 2. In order to prohibit a dentist from unintentionally pulling or withdrawing the plunger means 12 completely out from the open end of the barrel housing 11, the barrel housing 11 is provided with a restriction 23 adjacent the open end thereof. The arrangement is such that, as best seen in FIG. 7, the enlarged circumference 19A of the plunger cooperating with the restriction 23 form adjacent the opened end of the barrel housing 11 will create a friction stop which will normally prevent a dentist from withdrawing the plunger means 12 from the barrel housing. However, the complementary surface of the enlarged stem portion 19A and the restriction 23 provide a limited friction stop whereby the plunger 12 can be separated from the barrel housing 11 by only the application of a predetermined force.

Preferably, the complementary dimensions of the enlarged circumferential portion 19A of the plunger stem 19, and the restriction 23 of the barrel housing 11 are such that a pull of five to ten pounds is required to effect the separation thereof. For this reason, a dentist, when so inclined, can readily disassemble and assemble the component parts with a minimum of ease and without the need of any hand tools. Accordingly, the plunger and housing can be readily separated when desired for cleaning and/or the like.

Figure 5:
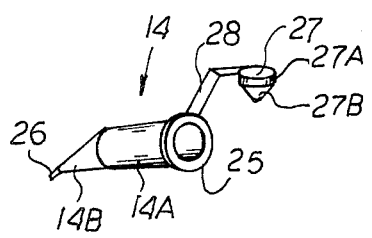
FIG. 5 is a detailed perspective view of the novel nozzle construction embodying the present invention.
Figure 6:
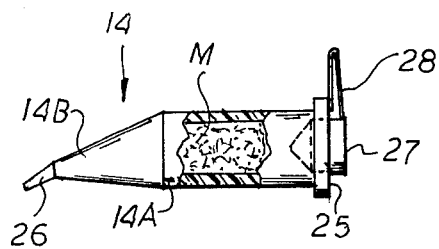
FIG. 6 is a detailed side elevation view illustrating the improved nozzle construction loaded and ready for use.

In accordance with this invention, an improved nozzle means is provided to effect the controlled extrusion of a dental filling material into a prepared tooth cavity. As best seen in FIGS. 5 and 6, the nozzle means 14 comprises a tubular body portion 14A which is open at one end and which is circumscribed by a laterally projecting flange 25, which is adapted to define a stop for the nozzle means, when the nozzle 14 is positioned in the opening 16 of the barrel housing end wall as best seen in FIG. 3. Connected to the other end of the tubular body portion is a discharge tip 14B which terminates in a discharge opening 26. As seen in FIGS. 5 and 6, the discharge tip is provided with a progressively decreasing cross section area extending toward the discharge opening 26. If desired, the discharge tip may be disposed at a suitable angle so as to facilitate the positioning of the filling material in a tooth cavity. However, it will be understood that the nozzle 14 may be formed with either a straight discharge tip portion, or an angular or curved discharge tip portion 14B as shown in FIGS. 5 and 6.

A piston 27 is provided to seal the open end of the nozzle means 14 and to provide a means whereby the filling material M disposed within the tubular body portion 14A of the nozzle means can be readily extruded through the discharge opening 26 thereof. In accordance with this invention, the piston 27 is integrally connected to the flange portion 25 of the nozzle means 14 by means of an integrally formed flexible connector means 28. The arrangement is such that the piston 27 and nozzle means 14 can be readily formed as an integral or unitary member with the connector 28 being sufficiently long so as to enable the piston 27 to be inserted into the open end of the nozzle means to seal the filling material therein, as best seen in FIG. 6, and to enable the piston to be displaced when the material M is extruded. It will be understood that the dentist may fill the tubular body portion 14A of the nozzle means 14 with a suitable dental filling material M; and that thereafter he can readily place the piston 27 in position, as seen in FIG. 6, to seal the material M within the nozzle body portion.

To eject the material M from the nozzle, the sealed nozzle means is inserted through the breech opening 17 of the gun 11 so that the nozzle 14 is extended through opening 16 as best seen in FIGS. 2 and 3. With the filled nozzle means 14 inserted into the opening 16 of the end wall 15 of the barrel housing, the applicator gun is ready for use. It will be noted that by projecting the plunger 19 toward its projected, operative position, the projecting tip 20 engages the back of the piston 27 causing the piston 27 to be displaced within the tubular body portion 14A of the nozzle whereby the dental filling material M in advance of the piston 27 is extruded through the discharge opening 26 of the nozzle tip, as may be required.

The projecting tip 20 is tapered so that the flexible connector 28 by which the piston 27 is integrally connected to the nozzle 14 can be readily extended into the tubular body portion of the nozzle means as the piston 27 is displaced without any binding or interference occuring between the advancing plunger tip 20 and the internal wall of the body portion 14A of nozzle 14 as is advanced.

It is to be noted that because the breech opening 17 is defined in the circumferential wall portion of the tubular housing 12, the enlarged circumferential portion 19A of the plunger stem 19 will not offer any substantial resistance to the displacement of the plunger within the barrel housing between the normal retracted position shown in FIG. 3 and the fully projected position as seen in FIG. 4. However, as the enlarged circumferential portion 19A of the plunger 19 is retracted past the trailing end of the breech opening 17, a frictional resistance can be felt, and which frictional resistance can be felt until the circumferential enlarged portion 19A engages the restriction 23 formed adjacent the end of the barrel, which resistance is sufficient to prohibit any unintentional separation of the plunger from the barrel. However, by applying greater force; e.g., five to ten pounds, between the plunger and the barrel, the plunger 12 can be readily pulled out or separated from the housing 11. It will be understood that the frictional force maintaining the end cap 21 to the plunger stem 19 is such that a force substantially greater than ten pounds would be required to effect the separation thereof.

With the construction described, it will be apparent that the respective components parts described can be made of relatively inexpensive material, e.g., plastic. In accordance with this invention, the integrally or unitarily formed nozzle means 14 and associated piston 27 greatly facilitates the loading and sealing of the dental material M within the tubular body portion of the nozzle. With the nozzle construction 14 and associated piston 27 described, there is no separation. Thus the piston is readily available to the dentist enabling the dentist to quickly fill and position the piston in place in the nozzle means. As best seen in FIGS. 5 and 6, the piston 27 is formed with annular portion 27A which is sized to be snugly received within the bore of the tubular body portion 14A to form a snug sliding fit and seal therebetween. The piston 27 is also provided with a tapered portion 27B to facilitate the alignment of the piston within the tubular body portion of the nozzle as the piston 27 is press fitted to the open end of the nozzle 14. The tapered portion also enables the piston to extrude virtually all of the material M contained in the discharge tip portion 14B, as best seen in FIG. 2.

While the nozzle means 14 described is adapted to be loaded by a dentist prior to application, it will be understood that the present invention contemplates that the nozzle means 14 may be preloaded so that a dentist may need only to insert a preloaded tip into the opening 16 in the end wall 15 of the housing 11. Such preloaded tips may be formed with a sealed discharge tip portion, which would then require a dentist to cut the tip end of the nozzle to provide or form the discharge opening 26.

Preferably, the nozzle means 14 is formed of a readily transparent plastic material so that a dentist can readily see the amount of material contained therein. Also, the nozzle is formed of a readily expendable plastic material so as the tip can be rendered readily disposable upon use.

It will be understood that while the nozzle means 14 is particularly useful in handling the newer composite resin filling material, the same construction may be used for placing acrylic fillings in cavities utilizing the same flow technique. Also, the dental gun described may be used for applying various types of cement in a cavity and/or in doing root canal type of work. The instrument can also be used to apply a rubber base or silicone into extremely small areas such as post holes and/or placing suitable liquid onto a precise area.

While the invention has been described with respect to a particular embodiment thereof, it will be understood and appreciated that variations and modifications may be made without departing from the spirit or scope of the invention.

What is claimed is:

1. A dental gun for effecting the flow technique of placing a predetermined quantity of a flowable filling material in a tooth cavity for restorative dentistry having a barrel housing formed with an end wall with an aperture therein, a plunger reciprocally mounted within said barrel housing for movement between a projected and retracted position relative to said barrel housing, and a nozzle means adapted for containing a supply of a dental filling material detachably connected to said end wall in communication with the aperture formed in said end wall, the improvement comprising of:

said nozzle means having a tubular body portion to define a reservoir for accommodating a supply of filling material, one end of said body portion being opened, a discharge tip connected to the other end of said body portion a piston adapted to be slideably disposed in the body of said nozzle means to confine the supply of filling material between said discharge tip and said piston in the loaded position of said nozzle means, a flexible connector integrally connecting said piston to said body portion, and said flexible connector being sufficiently long so as to extend the length of said defined reservoir internally thereof when said piston is displaced to eject the filling material from said discharge tip.

2. The invention as defined in claim 1 and including the improvement wherein said plunger has a projecting reduced tapered tip end arranged to engage said piston to effect the displacement thereof within said reservoir whereby said displacement effects a controlled discharge of the filling material, and said flexible connector being progressively extended into the tubular body as said piston is displaced.

3. The invention as defined in claim 1 wherein said plunger means includes a stem portion, said stem portion having an enlarged circumferance adjacent the projecting tip end, and said housing having a restricting means formed adjacent the end thereof, said enlarged circumference and restricting means defining a friction stop to normally prohibit the plunger means from being pulled out of said housing unless a predetermined amount of force is applied thereto.

4. The invention as defined in claim 3 wherein said barrel housing, plunger means and nozzle means are formed of plastic.

5. An improved nozzle construction for use in a dental gun for effecting the flow technique of placing a predetermined quantity of filling material in a tooth cavity comprising:

a tubular body portion to define a reservoir adapted for containing a supply of filling material, said tubular body being opened at one end through which the filling material can be loaded thereinto, a discharge tip portion connected to the other end of said body portion through which the filling material is discharged, a piston arranged to be slideably received within said tubular body, said piston defining a displaceable closure for the open end of said body portion, and a flexible connecting means for integrally connecting said piston to said tubular body portion whereby said piston is secured to said body portion in either the opened loading position thereof and the sliding displaceable position, and said flexible connecting means comprises a cord like connector which is sufficiently long so as to extend the length of said reservoir internally thereof in the displaced position of said piston.

6. The invention as defined in claim 5 wherein said nozzle is formed of a relatively inexpensive readily disposable material.

7. The invention as defined in claim 6 wherein said nozzle is transparent.

8. The invention as defined in claim 5 wherein said tubular body, discharge tip, piston and flexible connector are integrally connected and formed of the same material.

9. The invention as defined in claim 5 wherein said body portion includes a laterally extending flange portion formed about the opened loading end thereof, and said flexible connector interconnecting said piston to said flange portion.

10. A dental gun for effecting the flow technique of positioning a predetermined quantity of a flowably filling material in a tooth cavity for restorative dentistry, an elongated barrel housing having an end wall formed at one end and said barrel housing being opened at its other end, said end wall having an opening formed therein, said barrel housing having a breech opening formed in a circumferential wall portion thereof adjacent said end wall, means defining a restriction adjacent said open end of said barrel housing, a plunger means reciprocally mounted within said housing for movement between a projected position and a retracted position relative to said barrel housing, said plunger having a stem portion formed with a reduced and tapering projecting tip portion adapted to extend into the opening formed in said end wall, said stem portion having a slightly enlarged circumference adjacent said projecting tip end, said enlarged circumference and restricting means on said barrel forming a friction stop to normally prohibit the plunger from being pulled out of the housing in the retracted position, a finger guard connected to said barrel housing intermediate the ends thereof, and a nozzle means adapted to contain a supply of dental filling material arranged to be inserted through the opening in said end wall, said nozzle means including a tubular body defining a reservoir of receiving the filling material, a discharge tip connected to said body portion, and a piston adapted to be slideably disposed within said tubular body in the operative position thereof to extrude the filling material through said discharge tip upon such plunger being advanced to the projecting position, and a flexible connector tying said piston to said tubular body portion whereby said piston is at all times secured to said body portion, said connector comprises a cord integrally connected to said tubular body, said cord being sufficiently long so as to extend into said tubular body portion in the displaced position of said piston.

* * * * *